US006538046B1

(12) United States Patent
Paulus et al.

(10) Patent No.: US 6,538,046 B1
(45) Date of Patent: Mar. 25, 2003

(54) CURABLE POLYURETHANE POLYMER

(75) Inventors: Wolfgang Paulus, Ober-Olm (DE); Werner Lebkücher, Friedelsheim (DE); Klaus Menzel, Ludwigshafen (DE); Wolfgang Reich, Maxdorf (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 81 days.

(21) Appl. No.: 09/614,169

(22) Filed: Jul. 11, 2000

(30) Foreign Application Priority Data

Jul. 14, 1999 (DE) .......................... 199 33 012

(51) Int. Cl.$^7$ .............................. C08J 3/00; C08K 3/20; C08F 8/30; C08F 283/04; C08L 75/00
(52) U.S. Cl. ........................ 522/173; 522/96; 522/90; 522/174; 522/84; 524/507; 524/589; 524/590; 524/591; 524/839; 524/840; 525/123; 525/455; 528/44; 528/60; 528/59; 528/61; 528/65; 528/66; 528/67
(58) Field of Search ................... 528/65, 44, 60, 528/59, 61, 66, 67; 524/507, 589, 590, 591, 839, 840; 525/123, 455; 522/90, 96, 173, 174, 84

(56) References Cited

U.S. PATENT DOCUMENTS

| 4,357,221 | A |   | 11/1982 | Lehner et al. |       |
| 4,722,966 | A |   | 2/1988  | Flakus        |       |
| 5,089,376 | A |   | 2/1992  | Setthachayanon |      |
| 5,135,963 | A |   | 8/1992  | Haeberle et al. |     |
| 5,306,764 | A |   | 4/1994  | Chen          |       |
| 5,684,081 | A | * | 11/1997 | Dannhorn et al. | ......... 524/507 |
| 6,207,744 | B1 | * | 3/2001 | Paulus et al. | ................. 524/70 |

FOREIGN PATENT DOCUMENTS

| DE | 34 37 918  | 4/1986  |
| DE | 40 31 732  | 4/1992  |
| DE | 195 25 489 | 7/1995  |
| EP | 0 209 684  | 1/1987  |
| EP | 0 331 409  | 9/1989  |
| EP | 0 392 352  | 10/1990 |
| EP | 0 753 531  | 1/1997  |

\* cited by examiner

*Primary Examiner*—James J. Seidleck
*Assistant Examiner*—Sanza L. McClendon
(74) *Attorney, Agent, or Firm*—Oblon, Spivak, McClelland, Maier & Neustadt, P.C.

(57) ABSTRACT

The present invention provides a curable polyurethane polymer containing in copolymerized form A) from 10 to 60% by weight of at least one hydroxyl-containing prepolymer having at least one $\alpha,\beta$-ethylenically unsaturated double bond, B) from 0.1 to 30% by weight of at least one compound having at least one isocyanate-reactive hydroxyl group and/or primary or secondary amino group and, in addition, at least one polar functional group per molecule, C) from 0.1 to 30% by weight of at least one compound selected from diamines, polyamines and mixtures thereof, D) from 0 to 10% by weight of at least one further compound other than A), B), C) and E) having at least two isocyanate-reactive groups, which are hydroxyl groups and mixtures of hydroxyl groups with primary and/or secondary amino groups, E) from 0 to 20% by weight of at least one compound having an isocyanate-reactive group, F) from 10 to 65% by weight of at least one compound having at least two isocyanate groups, and the salts thereof, wherein the ratio of isocyanate group equivalents of component F) to equivalents of isocyanate-reactive groups of components A) to E) is in a range from 0.4:1 to 0.9:1, polymer dispersions comprising at least one such polymer, and the use thereof.

10 Claims, No Drawings

CURABLE POLYURETHANE POLYMER

The present invention relates to a curable polyurethane polymer containing in copolymerized form at least one hydroxyl-containing prepolymer having at least one thermally or photochemically free-radically polymerizable α,β-ethylenically unsaturated double bond. The invention further relates to an aqueous polymer dispersion comprising such a curable polymer in dispersed form and to the use of said polymer or polymer dispersion for coating substrates.

Aqueous polyurethane dispersions comprising components having ethylenically unsaturated groups have found broad application. They are used in particular to produce coatings on inflexible substrates such as wood, for example, and on flexible substrates, such as leather, for example. Their crosslinkability means that films formed from said dispersions generally have good performance properties, such as chemical resistance and increased mechanical stability as compared with uncrosslinkable polyurethane dispersions. To produce coatings on substrates having little or no heat resistance it is usual to use polyurethane dispersions which are radiation curable. An important property of these UV or EB (electron beam) curable dispersions is that as soon as the water they contain has evaporated the resulting films have a highly tack-free surface which may already be capable of withstanding mechanical stresses. This firstly permits the coating, inter alia, of substrates which owing to their external form exhibit radiation shadow regions and thus for technical reasons are not fully accessible to radiation curing. Secondly, the substrates can thus be subjected to mechanical operations even before curing. This is particularly important in the context of the production of coatings on wood, since in this case the surfaces are generally sanded before curing in order, for example, to remove the erect wood fibers and, in a second, coating step, to obtain a smooth surface. A further advantage of these coatings is their freedom from tack, with the consequence that the surfaces do not stick to one another, for example, when the substrates are stacked.

DE-A-34 37 918 describes aqueous oligourethane dispersions with incorporated unsaturated groups and their use for producing high gloss coatings on leather. EP-A-0 554 784 describes aqueous dispersions of a radiation-curable polyurethane whose structural components include polyols and polyisocyanates having isocyanurate or biuret groups. Evaporation of the water from the abovementioned polyurethane dispersions produces coatings which before radiation curing are still not able to withstand mechanical stresses and/or which produce tacky surfaces.

EP-A-0 209 684 describes aqueous emulsions based on ionic urethane urea acrylates.

None of the abovementioned publications describes polymer dispersions based on polyurethanes containing in copolymerized form hydroxyl-containing prepolymers having α,β-ethylenically unsaturated double bonds.

U.S. Pat. No. 4,357,221 describes a process for coating electroconductive parts in which an anionic polyurethane adduct is used that has α,β-ethylenically unsaturated, radiation-curable double bonds. This product is prepared by reacting a solution of a polyurethane based on an acrylic ester diol, a low or high molecular mass chain extender and a polyisocyanate with a salt of a mercaptocarboxylic acid. The carboxylate group is introduced into the polyurethane here by addition of the mercapto group not onto an isocyanate group but instead onto one of the double bonds in the polyurethane, forming a mercapto ether bridge.

DE-A-40 31 732 describes radiation-curable aqueous binder dispersions which feature a) from 5 to 95% by weight of a self-dispersible polyurethane, b) from 5 to 95% by weight of a prepolymer or prepolymer mixture dispersible with the aid of c), and c) from 0 to 30% by weight of a protective colloid.

Component a) is not an acrylate-containing prepolymer. The prepolymers b) can be polyesters, polyethers, polyepoxides or polyurethanes which are added separately to the aqueous dispersions and which are not, therefore, attached to the polyurethane component a). The coatings obtained with the dispersions based on a mixture of a) and b) are in need of improvement as regards their performance properties. For instance, the pendulum hardness of the radiation-cured films of the working examples is at most 115 s.

EP-A-0 392 352 describes aqueous dispersions of radiation-curable polyurethanes formed from a) 1 gram equivalent of NCO of a polyisocyanate, b) from 0.1 to 0.8 gram equivalent of OH of a polyol having a molecular weight of from 400 to 6000 g/mol, c) from 0 to 0.8 gram equivalent of OH of a polyol having a molecular weight of from 62 to 399 g/mol, d) from 0 to 0.4 gram equivalent of NH of a polyamine having at least two isocyanate-reactive amino groups, e) from 0 to 0.4 gram equivalents of OH of an amino alcohol having at least one isocyanate-reactive amino group, f) from 0.05 to 0.5 gram equivalent of OH or of NH of a compound with ionic groups, or groups which can be converted to ionic groups, having at least one isocyanate-reactive hydroxyl or amino group, g) from 0 to 0.2 gram equivalent of OH of a monofunctional polyetherol, and h) a compound having at least one ethylenically unsaturated group and at least one hydroxyl group, with the provisos that (i) the sum of the OH and NH gram equivalents is from 0.9 to 1.2, (ii) the components under a) to h) can be in the form of individual components or mixtures, and (iii) the ethylenically unsaturated component h) is used in amounts of from 0.02 to 0.08 gram equivalent of OH. The amount of polymerizable ethylenically unsaturated groups per 1000 g of polyurethane is therefore very low and is not more than 0.166 mol/kg.

DE-A-195 25 489 describes polyester acrylate urethane dispersions based on hydroxyl-containing polyester acrylate prepolymers. These dispersions are prepared by polyaddition of a) from 40 to 90% by weight of one or more hydroxyl-containing polyester acrylate prepolymers having an OH content of from to 120 mg KOH/g, and p1 b) from 0.1 to 20% by weight of one or more monofunctional and/or difunctional, isocyanate-reactive compounds containing cationic groups, anionic groups and/or groups which exert a dispersing action by virtue of ether units, with c) from 10 to 50% by weight of one or more polyisocyanates, and by subsequent reaction with d) from 0.1 to 10% by weight of one or more diamines and/or polyamines.

The coatings obtained with these dispersions are in need of improvement as regards their performance properties. For instance, the films as yet uncured by radiation have an inadequate pendulum hardness; in other words, under mechanical load, the coated substrates adhere to one another and to other uncoated surfaces, and surface damage may remain when the substrates are subsequently separated. This is a disadvantage in particular if the dispersions as described above are used to coat surfaces with have shadow regions that are difficult to access for radiation curing. The cured films as well are in need of improvement in terms of their mechanical properties, especially in terms of a satisfactory combination of surface hardness with film flexibility.

None of the abovementioned documents describes curable polyurethane polymers where the molar ratio of incorporated isocyanato components to components having isocyanate-reactive groups is chosen such that not more than 90% of the latter are reactive.

It is an object of the present invention to provide a curable polyurethane polymer suitable for preparing aqueous polymer dispersions having good performance properties.

We have found that this object is achieved by a curable polyurethane polymer where the ratio of isocyanate group equivalents of the incorporated isocyanato components to equivalents of isocyanate-reactive groups of the components containing active hydrogen atoms is in a range from about 0.4:1 to 0.9:1.

The present invention therefore provides a curable polyurethane polymer containing in copolymerized form A) from 10 to 60% by weight, based on the overall weight of components A) to F), of at least one hydroxyl-containing prepolymer having at least one thermally or photochemically polymerizable $\alpha,\beta$-ethylenically unsaturated double bond, B) from 0.1 to 30% by weight, based on the overall weight of components A) to F), of at least one compound having at least one isocyanate-reactive hydroxyl group and/or primary or secondary amino group and, in addition, at least one polar functional group per molecule, C) from 0.1 to 30% by weight, based on the overall weight of components A) to F), of at least one compound selected from diamines, polyamines and mixtures thereof, D) from 0 to 10% by weight, based on the overall weight of components A) to F), of at least one further compound other than A), B), C) and E) having at least two isocyanate-reactive groups, which are hydroxyl groups and mixtures of hydroxyl groups with primary and/or secondary amino groups, E) from 0 to 20% by weight, based on the overall weight of components A) to F), of at least one compound having an isocyanate-reactive group, F) from 10 to 65% by weight, based on the overall weight of components A) to F), of at least one compound having at least two isocyanate groups, and the salts thereof, wherein the ratio of isocyanate group equivalents of component F) to equivalents of isocyanate-reactive groups of components A) to E) is in a range from 0.4:1 to 0.9:1.

The ratio of isocyanate group equivalents of component F) to equivalents of isocyanate-reactive groups of components A) to E) is preferably in a range from about 0.45:1 to 0.8:1.

The sum of the hydroxyl numbers of components A) and D) is preferably in a range from about 40 to 300 mg KOH/g. The hydroxyl numbers of components A) and D) of the polymers of the invention can be, for example, in a range from about 40 to 120 mg KOH/g. Preferably, the sum of the hydroxyl numbers of components A) and D) is in a range from 121 to 300 mg KOH/g, with particular preference from 125 to 220 mg KOH/g, in particular from 130 to 200 mg KOH/g.

If desired, the use of a component D) in the polymers of the invention can be omitted. In that case, the hydroxyl number of the prepolymer A) is preferably in a range from about 121 to 300 mg KOH/g, more preferably from 123 to 220 mg KOH/g, in particular from about 125 to 200 mg KOH/g. In one possible embodiment, however, the polymers of the invention may also contain incorporated a prepolymer A) having a hydroxyl number of at least 121 mg KOH/g and, in addition, a component D).

The amount of polymerizable, $\alpha,\beta$-ethylenically unsaturated double bonds is generally in a range from about 1.0 to 4.0 mol per 1000 g of polymer, preferably from about 1.1 to 3.8 mol, in particular from 1.2 to 3.5 mol, per 1000 g of polymer.

The amount of polar functional groups in the polymers of the invention is generally in a range from about 0.8 to 3.5% by weight, preferably from 0.9 to 3.3% by weight. Polymers containing an amount of polar functional groups in the range from about 1.3 to 3.5% by weight are generally self-dispersible and can if desired be formulated to the polymer dispersions of the invention even without the addition of dispersing auxiliaries.

The K value of the prepolymer prior to dispersion and chain extension, determined by the method of E. Fikentscher, Cellulose-Chemie 13 (1932), 58-64, on a 1% strength solution in dimethylformamide, is in a range from about 20 to 70, preferably from 30 to 60, in particular from 45 to 55.

Hydroxyl-containing prepolymers A) having at least one thermally or photochemically free-radically polymerizable $\alpha,\beta$-ethylenically unsaturated double bond are preferably selected from polyester acrylates, polyether acrylates, polyurethane acrylates, epoxy acrylates, and mixtures thereof.

Examples of suitable polyester acrylates are the polycondensation products of $\alpha,\beta$-ethylenically unsaturated mono-carboxylic and/or dicarboxylic acids and their anhydrides with polyester polyols. Examples of $\alpha,\beta$-ethylenically unsaturated monocarboxylic and/or dicarboxylic acids and their anhydrides which can be used are acrylic acid, methacrylic acid, fumaric acid, maleic acid, maleic anhydride, crotonic acid, itaconic acid, etc. It is preferred to use acrylic acid and methacrylic acid. Suitable polyesterols are linear and branched polymers having terminal OH groups, e.g., those having at least two OH end groups. The polyesterols can be prepared in a simple manner by esterifying aliphatic, cycloaliphatic and aromatic dicarboxylic acid, tricarboxylic and/or polycarboxylic acids with diols, triols and/or polyols. Examples of suitable carboxylic acids are dicarboxylic acids having 2 to 20 carbon atoms, preferably 4 to 15 carbon atoms, examples being malonic acid, succinic acid, adipic acid, glutaric acid, pimelic acid, suberic acid, sebacic acid, dodecanedioc acid, phthalic acid, terephthalic acid, isophthalic acid, cyclohexanedicarboxylic acid, etc. Also suitable are sulfosuccinic acid and sulfoisophthalic acid. The dicarboxylic acids can be used individually or as mixtures. Examples of suitable diols are glycols, preferably glycols having 2 to 25 carbon atoms. Examples of suitable glycols are 1,2-ethanediol, 1,3-propanediol, 1,4-butanediol, 1,5-pentanediol, 1,6-hexanediol, 1,10-decanediol, diethylene glycol, 2,2,4-trimethyl-1,5-pentanediol, 2,2-dimethyl-1,3-propanediol, 1,4-cyclohexanediol, 1,4-dimethylolcyclohexane, 1,6-dimethylolcyclohexane and ethoxylated/propoxylated products of 2,2-bis(4-hydroxyphenyl)propane(bisphenol A), etc. Suitable triols and polyols have 3 to 25 carbon atoms, for example, preferably 3 to 18 carbon atoms. Examples include glycerol, trimethylolpropane, erythritol, pentaerythritol, sorbitol, and alkoxylates thereof, etc. Suitable polyesterols can likewise be prepared by polymerizing lactones, e.g., lactones having 3 to 20 carbon atoms. Examples of suitable lactones for preparing the polyesterols are α,α-dimethyl-β-propiolactone, γ-butyrolactone, ε-caprolactone, etc.

Further suitable polyester acrylates are condensation products based on hydroxyl-containing esters of acrylic acid and/or methacrylic acid with at least dihydric alcohols. Examples include 2-hydroxyethyl acrylate, 2-hydroxyethyl methacrylate, 2-hydroxypropyl acrylate, 2-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, and di(meth)acrylic esters of 1,1,1-trimethylolpropane or of glycerol. These hydroxyl-containing esters can be polycondensed with polyesterols having terminal carboxyl groups, or with the dicarboxylic acids and glycols forming these polyesterols, to give polyester acrylates.

Examples of suitable polyether acrylates A) are the polycondensation products of the abovementioned α,β-ethylenically unsaturated monocarboxylic and/or dicarboxylic acids and their anhydrides with polyetherols. Polyetherols which can be used here are linear or branched substances having terminal hydroxyl groups, containing ether bonds and possessing a molecular weight in the range from, for example, about 300 to 10,000, preferably from 400 to 5000. Suitable polyetherols can easily be prepared by polymerizing cyclic ethers, such as tetrahydrofuran, or by reacting one or more alkylene oxides having 2 to 4 carbon atoms in the alkyl radical with a starter molecule which contains two active hydrogen atoms bonded in the alkylene radical. Examples of alkylene oxides that may be mentioned include ethylene oxide, 1,2-propylene oxide, epichlorohydrin, 1,2- and 2,3-butylene oxide. The alkylene oxides can be used individually, alternately in succession, or as a mixture. Examples of suitable starter molecules are water, the abovementioned glycols, polyesterols, triols and polyols, amines, such as ethylenediamine, hexamethylenediamine and 4,4'-diaminodiphenylmethane and also amino alcohols, such as ethanolamine. Like the polyesterols, the polyetherols too can be used alone or in mixtures.

Examples of suitable polyurethane acrylates A) are the polyaddition products of the polyisocyanates described below as component F) with the above-described hydroxyl-containing esters of acrylic and/or methacrylic acid with at least dihydric alcohols. As the polyisocyanates used here, preference is given to diisocyanates, such as 2,4- and 2,6-tolylene diisocyanate (TDI) and isomer mixtures thereof, tetramethylxylylene diisocyanate (TMXDI), tetramethylene diisocyanate, hexamethylene diisocyanate (HDI) and its trimers, isophorone diisocyanate (IPDI), trimethylhexamethylene diisocyanate, 1,3-cyclohexane diisocyanate and its trimers, dicyclohexylmethane diisocyanate ($H_{12}$MDI), xylene diisocyanate (XDI), and diphenylmethane diisocyanate (MDI). Preferred hydroxyl-containing esters of acrylic acid and/or methacrylic acid are the abovementioned hydroxyalkyl (meth)acrylates, preferably hydroxymethyl acrylate, hydroxypropyl acrylate, and hydroxyethyl methacrylate.

Examples of suitable epoxy acrylates A) are the reaction products of compounds having at least one epoxide group with compounds having per molecule at least one α,β-ethylenically unsaturated double bond and at least one group which is reactive toward epoxide groups. The latter compounds are preferably selected from α,β-ethylenically unsaturated monocarboxylic and dicarboxylic acids and their anhydrides, especially acrylic acid, methacrylic acid, fumaric acid, maleic acid, maleic anhydride, crotonic acid, and itaconic acid. Particular preference is given to the use of acrylic acid and/or methacrylic acid. The compound containing epoxide groups is preferably selected from glycidyl ethers, glycidyl esters, epoxidized olefins, epoxidized cyclic ureas, epoxidized triazines, and mixtures thereof. Suitable glycidyl ethers are prepared, for example, by reacting at least one aliphatic, cycloaliphatic or aromatic monohydric or dihydric alcohol with at least one epoxide compound having a suitable leaving group, e.g., halogen, ato the epoxide group. The epoxide compound used for glycidyl ether preparation, as also for glycidyl ester preparation and for epoxidization of ureas and triazines, is preferably epichlorohydrin. The alcohol component preferably used for glycidyl ether preparation is at least one of the abovementioned diols, triols and/or polyols, especially 1,4-butanediol, 1,4-cyclohexanediol, 1,4-dimethylolcyclohexane, 1,6-dimethylolcyclohexane, bisphenol A, hydrogenated bisphenol A, and mixtures thereof.

Depending on the molar ratio of epoxide compound to alcohol component, the reaction of dihydric or polyhydric alcohols and epoxide compounds having a leaving group a to the epoxide group results in glycidyl ethers or, with an increasing amount of alcohol, in relatively high molecular mass hydroxyl-containing diepoxides or polyepoxides. In general, both glycidyl ethers and higher molecular mass products are suitable for preparing epoxy acrylates A) that can be used in accordance with the invention. Preferred glycidyl esters for preparing epoxy acrylates A) are, for example, the reaction products of aliphatic, cycloaliphatic or aromatic monocarboxylic, dicarboxylic or polycarboxylic acids with at least one epoxide compound having a leaving group a to the epoxide group. The carboxylic acid component used for glycidyl ester preparation preferably comprises dicarboxylic acids, such as dimerized fatty acids. A preferred glycidyl ester for preparing epoxy acrylates A) that can be used in accordance with the invention is bisepoxycyclohexylmethyl carboxylate. Preferred compounds having epoxide groups for preparing epoxy acrylates A) that can be used in accordance with the invention also include aromatic glycidyl amines, especially the triglycidyl adduct of p-aminophenol and the tetraglycidyl amine of methylenedianiline, heterocyclic glycidylimides and glycidylamides, especially triglycidyl isocyanurate, and epoxy resins based on hydantoin, etc. Suitable compounds containing epoxide groups for preparing the epoxy acrylates A) are known to the skilled worker and are available commercially. Examples include the Araldit® grades from Ciba.

Suitable epoxy acrylates A) also include epoxy acrylates based on epoxy novolacs, epoxidized oils, such as soybean oil or linseed oil, etc.

Preferred epoxy acrylates A) are selected from the reaction products of 1,4-butanediol diglycidyl ether, 1,4-cyclohexanediol diglycidyl ether, 1,4- and 1,6-dimethylolcyclohexane diglycidyl ether, bisepoxycyclohexylmethyl carboxylate, triglycidyl isocyanurate and bisphenol A diglycidyl ether with acrylic acid and/or methacrylic acid, and also mixtures of these reaction products. Particularly preferred for use as epoxy acrylates A) are the reaction products of one mol of a bisphenol A diglycidyl ether (e.g., Epikote® 828 from Shell) with two moles of acrylic acid or methacrylic acid. The hydroxyl number of Epikote® 828 diacrylate is about 215 mg KOH/g. Particular preference is also given to the use of mixtures of epoxy acrylates A) comprising at least one epoxy acrylate based on a bisphenol A diglycidyl ether.

In one preferred embodiment, the prepolymer A) is a reaction product of a mixture of a) at least one polyester acrylate and/or polyether acrylate and/or polyurethane acrylate, and b) at least one epoxy acrylate.

Polyester acrylates, polyether acrylates, polyurethane acrylates and epoxy acrylates and their preparation are described for example in N. S. Allen, M. A. Johnson, P. Oldring (Ed.) and M. S. Salim, Chemistry & Technology of UV&EB-Curing Formulations for Coatings, Inks & Paints, Vol. 2, SITA Technology, London 1991.

The polyurethane polymer of the invention comprises component B), which has at least one isocyanate-reactive hydroxyl and/or amino group, and also has at least one polar functional group, in a proportion of in general from about 0.1 to 30% by weight, preferably from 1.0 to 25% by weight, in particular from 2.0 to 20% by weight, based on the overall weight of components A) to F), in copolymerized form. Component B) is selected from substances having at least one polar functional group selected from ionogenic and/or ionic groups, and polyether groups.

These groups promote in general advantageously the dispersion of the polyurethanes in water. The ionogenic and/or ionic groups are preferably carboxylic acid groups, phosphonic acid groups, phosphoric acid groups and/or sulfonic acid groups and/or nitrogen-containing groups (amines) and/or carboxylate groups and/or sulfonate groups and/or quaternized or protonated groups. As component B) it is therefore possible to use, for example, hydroxy carboxylic acids, such as hydroxyacetic acid (glycolic acid), hydroxypropionic acid (lactic acid), hydroxysuccinic acid (malic acid) and salts thereof, preferably dimethylolpropanoic acid and the alkali metal salts and ammonium salts thereof. Suitable compounds B) having at least one sulfonic acid group or a sulfonate as polar functional group are, for example, the diesterdiols or polyesterdiols of dicarboxylic acids which also have at least one sulfonic acid group or metal sulfonate group with the diols mentioned above as starting materials for the prepolymers A). Examples of dicarboxylic acids which can be used are sulfosuccinic acid, 4-sulfophthalic acid, 5-sulfoisophthalic acid, sulfoterephthalic acid, 4-sulfonaphthalene-2,7-dicarboxylic acid, 5-(4-sulfophenoxy)terephthalic acid, or the corresponding metal sulfonates. It is preferred to use the alkali metal salts of the abovementioned sulfodicarboxylic acids, especially the sodium salts and potassium salts. Particular preference is given to sodium dihydrogen 5-sulfoisophthalate, potassium dihydrogen 5-sulfoisophthalate, sodium dihydrogen sulfoterephthalate and potassium dihydrogen sulfoterephthalate. Further suitable compounds B) having at least one sulfonic acid or sulfonate group are appropriately substituted straight-chain or branched aliphatic, cycloaliphatic or aromatic diols. They include, for example, 2-sulfo-1,4-butanediol, 2,5-dimethyl-3-sulfo-2,5-hexanediol, and the sodium salts and potassium salts thereof.

It is also possible to use compounds B) of the formulae

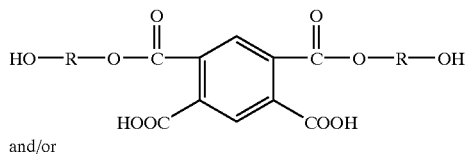

and/or

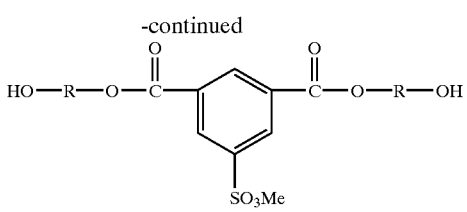

where each R is a $C_2$–$C_{18}$-alkylene group and Me is Na or K.

Also suitable for use as component B) are compounds of the formulae

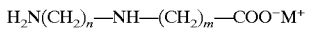

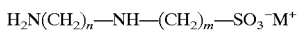

where m and n independently of one another are an integer from 1 to 8, in particular from 1 to 6, and M is hydrogen, Li, Na, K or ammonium. In these compounds, m and n are preferably 2.

If compounds with nitrogen-containing groups are used as component B), cationic polyurethanes are obtained. Examples of components B) which can be used are compounds of the formulae

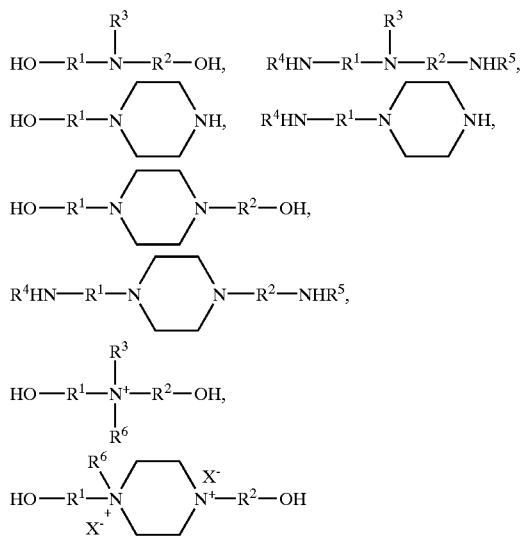

where
  $R^1$ and $R^2$, which can be identical or different, are $C_2$–$C_8$-alkylene,
  $R^3$, $R^6$ and $R^7$, which can be identical or different, are $C_1$–$C_6$ alkyl, phenyl or phenyl-$C_1$–$C_4$ alkyl,
  $R^4$ and $R^5$, which can be identical or different, are H or $C_1$–$C_6$ alkyl, and
  $X^-$ is an anion, preferably chloride, bromide, iodide, $C_1$–$C_6$ alkyl sulfate, or $SO_4^{2-}/2$.

In another suitable embodiment component (B) is an amine of the formula:

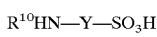

where
  Y is o-, m- or p-phenylene or straight-chain or branched $C_2$–$C_6$ alkylene which is unsubstituted or substituted by 1, 2 or 3 hydroxyl groups, and
  $R^{10}$ is a hydrogen atom, a $C_1$–$C_{12}$ alkyl group (preferably $C_1$–$C_{10}$ and in particular $C_1$–$C_6$ alkyl group) or a $C_5$–$C_6$ cycloalkyl group, said alkyl group or said cycloalkyl group being unsubstituted or substituted by 1, 2 or 3 hydroxyl groups, carboxyl groups or sulfonic acid groups.

The amine of the above formula is preferably taurine, N-(1,1-dimethyl-2-hydroxyethyl)-3-amino-2-hydroxypropanesulfonic acid, or 2-aminoethylaminoethanesulfonic acid.

In a further suitable embodiment the amine is a customary α-, β- or γ-amino acid; for example, glycine, alanine, valine, leucine, isoleucine, phenylalanine, tyrosine, proline, hydroxyproline, serine, threonine, methionine, cysteine, tryptophan, β-alanine, aspartic acid, or glutamic acid.

The polyurethanes containing acid groups can be converted by neutralization (partial or complete) into a water-dispersible form. Bases used for the neutralization can be alkali metal bases such as sodium hydroxide, potassium hydroxide, sodium carbonate, sodium hydrogencarbonate, potassium carbonate or potassium hydrogencarbonate, and alkaline earth metal bases such as calcium hydroxide, calcium oxide, magnesium hydroxide or magnesium carbonate, and also ammonia and amines, such as trimethylamine, triethylamine, triisopropylamine, etc. The polyurethanes containing acid groups can also be neutralized using mixtures of two or more bases, examples being mixtures of an alkali metal hydroxide, such as sodium hydroxide, and an amine, such as triethanolamine, triisopropylamine, etc. Neutralization can if desired be carried out partially, e.g., to the extent of from 10 to 99%—such as, for example to the extent of from 20 to 80%—or completely, i.e., to the extent of 100%.

Charged cationic groups can be generated from the existing tertiary amine nitrogen atoms either by protonation, with carboxylic acids such as acetic acid, propionic acid, butyric acid, and lactic acid, for example, or by quaternization, with alkylating agents such as $C_1$ to $C_4$ alkyl halides or sulfates, for example. Examples of such alkylating agents are ethyl chloride, ethyl bromide, methyl chloride, methyl bromide, dimethyl sulfate, and diethyl sulfate.

The compounds suitable as component B) which have only one isocyanate-reactive group act as stoppers to interrupt the polyaddition. In the preparation of the polymers of the invention, they can be added, if desired, at the end of the polyaddition reaction in order to convert at least some of any remaining free isocyanate groups.

It is preferred as component B) to use compounds which have at least two isocyanate-reactive groups, examples being amino and/or hydroxyl groups, and at least one further polar functional group.

As compounds B) it is also possible to employ the polyetherols, described above as a component of the prepolymers A), which are based on cyclic ethers and alkylene oxides. Also suitable are α,ω-diamino polyethers, which are obtainable, for example, by reacting the polyetherols with ammonia. Examples of further suitable compounds B) are trimethylolpropane alkoxylated on one hydroxyl group, for example, the alkoxylate residue having a terminal carboxylate or sulfonate group. The alkoxylate residue here can comprise in incorporated form ethylene oxide, propylene oxide and mixtures thereof, for example. The molecular weight of these compounds is in a range from about 500 to 2000. They are obtainable, for example, as Tegomer® grades from Goldschmidt.

The polyurethanes contain in copolymerized form as component C) at least one compound selected from diamines, polyamines and mixtures thereof in a proportion of from about 0.1 to 30% by weight, preferably from 0.5 to 25% by weight, in particular from 1 to 20% by weight, based on the overall weight of components A) to F). Component C) contains no polar functional groups.

Suitable amines C) are straight-chain and branched, aliphatic and cycloaliphatic amines having in general about 2 to 30, preferably about 2 to 20 carbon atoms. Examples thereof include ethylenediamine, 1,2-diaminopropane, 1,3-diaminopropane, 1,4-diaminobutane, 1,5-diaminopentane, 1,6-diaminohexane, 1,7-diaminoheptane, 1,8-diaminooctane, 1,9-diaminononane 1,10-diaminodecane, 1,11-diaminoundecane, 1,12-diaminododecane, diethylenetriamine, triethylenetetramine, 4-azaheptamethylenediamine, N,N'-bis(3-aminopropyl) butane-1,4-diamine, and mixtures thereof. Suitable polyamines C) generally have a number-average molecular weight of from about 400 to 10,000, preferably from about 500 to 8000. Examples of these include polyamides having terminal primary or secondary amino groups, polyalkyleneimines, preferably polyethyleneimines, and vinylamines obtained by hydrolysis of poly-N-vinylamides, such as poly -N-vinylacetamide, for example, and also the abovementioned α,ω-diamines based on aminated polyalkylene oxides. Copolymers which contain in copolymerized form α,β-ethylenically unsaturated monomers having appropriate functional groups, e.g., aminomethyl acrylate, aminoethyl acrylate, (N-methyl)aminoethyl acrylate, (N-methyl)aminoethyl methacrylate, etc., are also suitable for introducing photochemically or free-radically curable double bonds into the polyurethanes.

In order to optimize further the polymer properties, the polyurethanes can if desired contain in copolymerized form as component D) at least one further compound having at least two isocyanate-reactive groups, in a proportion of from 0.01 to 10% by weight, preferably from about 0.1 to 5% by weight, based on the overall weight of components A) to F).

As component D) it is possible, for example, to use polyols whose molecular weight is generally in a range from about 62 to 399 g/mol. Examples of these include diols having 2 to 18 carbon atoms, preferably 2 to 10 carbon atoms, such as 1,2-ethanediol, 1,3-propanediol, 1,4-butanediol, 1,6-hexanediol, 1,5-pentanediol, 1,10-decanediol, 2-methyl-1,3-propanediol, 2-methyl-2-butyl-1, 3-propanediol, 2,2-dimethyl-1,3-propanediol, 2,2-dimethyl-1,4-butanediol, 2-ethyl-2-butyl-1,3-propanediol, neopentylglycol hydroxypivalate, diethylene glycol, and triethylene glycol. Suitable triols and polyols of higher functionality are compounds having 3 to 25, preferably 3 to 18, and, with particular preference, 3 to 6 carbon atoms. Examples of triols which can be used are glycerol and trimethylolpropane. As polyols of higher functionality it is possible, for example, to use erythritol, pentaerythritol, and sorbitol. Also suitable are low molecular mass reaction products of the polyols: for example, those of trimethylolpropane with alkylene oxides, such as ethylene oxide and/or propylene oxide. These low molecular mass polyols can be used individually or as mixtures.

Further suitable components D) include amino alcohols having 2 to 16, preferably 3 to 6 carbon atoms, such as monoethanolamine, methylisopropanolamine, ethylisopropanolamine, methylethanolamine, 3-aminopropanol, 1-ethylaminobutan-2-ol, methylenediethanolamine, 4-methyl-4-aminopentan-2-ol, and N-(2-hydroxyethyl)aniline, and mixtures thereof.

As component D) it is also possible to use polyols of relatively high molecular mass, having a number-average molecular weight in the range from about 400 to 6000 g/mol, preferably from 500 to 4000 g/mol. Examples of these include the polyesterols described above in connection with component A), based on aliphatic, cycloaliphatic and/or aromatic dicarboxylic, tricarboxylic and/or polycarboxylic acids with diols, triols and/or polyols, and also the lactone-based polyesterols. They also include the polyetherols, likewise described above in connection with component A), obtainable by polymerizing cyclic ethers or by reacting alkylene oxides with a starter molecule. Also included here, furthermore, are customary polycarbonates, known to the skilled worker, having terminal hydroxyl groups, which are obtainable by reacting the above-described diols or else bisphenols, such as bisphenol A, with phosgene or carbonic diesters. Suitability extends to α,ω-polyamidols, α,ω-polymethyl(meth)acrylate diols and/or α,ω-polybutyl (meth)acrylate diols, such as MD-1000 and BD-1000 from Goldschmidt for example.

The abovementioned components D) can be used individually or as mixtures.

The polyurethanes may as component E) include at least one further compound having only one isocyanate-reactive group. This group can be a hydroxyl group or a primary or secondary amino group. The polyurethanes of the invention may contain component E) in copolymerized form in an amount of from 0.01 to 10% by weight, preferably from 0.1 to 5% by weight, based on the overall amount of components A) to F).

Examples of compounds which can be used as component E) are monohydric alcohols, such as methanol, ethanol, n-propanol, isopropanol, etc. Suitable components E) also include amines having a primary or secondary amino group, such as methylamine, ethylamine, n-propylamine, isopropylamine, dimethylamine, diethylamine, di-n-propylamine, diisopropylamine etc.

Component E) may further comprise monofunctional polyether alcohols having a number-average molar weight in the range from about 500 to 10,000 g/mol, preferably from 1000 to 5000 g/mol. Monohydric polyether alcohols are obtainable by alkoxylating monofunctional starter molecules, such as methanol, ethanol or n-butanol, for example, using alkoxylating agents comprising ethylene oxide or mixtures ethylene oxide with other alkylene oxides, especially propylene oxide.

By means of this component E) it is therefore possible for there to be polyethylene oxide segments, present if appropriate in terminal and/or pendant polyether chains, incorporated into the polyurethanes, the segments, in addition to the ionic groups, influencing the hydrophilic character in the polyurethane.

The compounds of the type specified, with polyethylene oxide units present within terminal and/or pendant polyether chains, are used in amounts such that in the polyurethane dispersions there can be from 0 to 10% by weight, preferably from 0 to 5% by weight, of polyethylene oxide units incorporated within terminal and/or pendant polyether chains in the polyurethanes. The overall amount of the hydrophilic structural units (ionic groups and ethylene oxide units of the latter type) is generally chosen so as to ensure the dispersibility of the polyurethanes in water.

The polyurethanes contain in copolymerized form as component F) at least one polyisocyanate in a proportion of from about 10 to 65% by weight, preferably from about 15 to 60% by weight, based on the overall weight of components A) to F). Suitable polyisocyanates F) are selected from compounds having 2 to 5 isocyanate groups, isocyanate prepolymers with an average number of 2 to 5 isocyanate groups, and mixtures thereof. Examples include aliphatic, cycloaliphatic and aromatic diisocyanates, triisocyanates and polyisocyanates. Examples of suitable diisocyanates F) are tetramethylene diisocyanate, hexamethylene diisocyanate, 2,3,3-trimethylhexamethylene diisocyanate, 1,4-cyclohexylene diisocyanate, isophorone diisocyanate, 1,4-phenylene diisocyanate, 2,4- and 2,6-tolylene diisocyanate and their isomer mixtures (e.g., 80% 2,4- and 20% 2,6-isomer), 1,5-naphthylene diisocyanate, 2,4- and 4,4'-diphenylmethane diisocyanate. A suitable triisocyanate is, for example, triphenylmethane 4,4',4"-triisocyanate. Suitability extends to isocyanate prepolymers and polyisocyanates obtainable by subjecting the abovementioned polyisocyanates to addition reactions with polyfunctional hydroxy or amino compounds. Also suitable are polyisocyanates produced by the formation of biuret or isocyanurate. Preference is given to the use of hexamethylene diisocyanate, trimerized hexamethylene diisocyanate, isophorone diisocyanate, 2,4-tolylene diisocyanate, 2,6-tolylene diisocyanate, and mixtures thereof.

The invention additionally provides polymer dispersions comprising at least one of the above-described polymers in dispersed form. The polyurethane dispersions of the invention are prepared by customary processes which are known to the skilled worker. These processes are described, for example, in Ullmann's Encyclopedia of Industrial Chemistry, 5th ed., Vol. A 21, VCH Weinheim, (1992), pp. 678–680. Examples include the spontaneous dispersion of polyurethane ionomers by the acetone process, prepolymer mixing processes, melt emulsion processes, etc. They also include the ketimine and ketazine processes, and the dispersion of precursors, where hydrophilic oligomers are dispersed.

To prepare the curable polyurethane polymers of the invention it is possible, for example, first to react components A), B), F) and, if desired, D) and/or E) in the melt or in the presence of an inert, water-miscible solvent to give an isocyanato-containing polyurethane prepolymer. Preferred solvents are, for example, acetone, tetrahydrofuran, methyl ethyl ketone, and N-methylpyrrolidone. The reaction temperature is generally in a range from about 20 to 160° C., preferably from about 50 to 100° C. In carrying out the reaction it is possible, for example, to heat the batch at reflux under ambient pressure. In order to accelerate the addition reaction it is possible to use customary catalysts, such as dibutyltin dilaurate, tin(II) octoate, 1,4-diazabicyclo[2.2.2] octane, or amines, such as triethylamine, for example. In order to prevent unwanted premature polymerization of the α,β-ethylenically unsaturated groups, it is possible if desired to add polymerization inhibitors when preparing the polyurethane. Examples of suitable such inhibitors are quinones, phenols or phenol derivatives, such as p-benzoquinone, hydroquinone, p-methoxyphenol, phenothiazine, 2,2,6,6-tetramethylpiperidin-1-yloxy, 4-hydroxy -2,2,6,6-tetramethylpiperidin-1-yloxy etc. Suitable polymerization inhibitors are described, for example, in Encyclopedia of Polymer Science & Technology, Vol. 7, 1967, pp. 644–664, Verlag Wiley & Sons, New York-London-Sydney.

Following the preparation of the isocyanato-containing polyurethane prepolymer it is possible, if desired, to ionize the copolymerized ionogenic groups, as described above in connection with component B), by neutralization or quaternization. If the polymers of the invention are prepared using at least one compound having only one isocyanate-reactive group as the sole or additional component B) then said compound is generally not added until toward the end of the reaction, or after the reaction, of the other components. If the polymers of the invention are prepared using a component E) which likewise has only one isocyanate-reactive group and thus acts as a stopper, then it is also generally not added until toward the end, or after, the reaction of the other components, and if appropriate not until after component C) has been added.

Finally, the isocyanato-containing prepolymer is reacted with component C) to give the polyurethane of the invention, which is essentially free from isocyanate groups, this reaction involving an increase in molar mass. In one preferred embodiment, component C) is used together with at least part of the dispersion water necessary for the preparation of the polymer dispersions of the invention. In this case the isocyanato-containing polyurethane prepolymers either can be introduced into the dispersion water comprising component C) or can have added to them a mixture of component C) and dispersion water. The amount of component C) here is chosen so that the resulting polyurethane is essentially from isocyanate groups. If desired, the solvent can be removed by distillation following the addition of the dispersion water. The amount of dispersion water is such as to give the resulting aqueous polyurethane dispersions a solids content of from about 10 to 70% by weight, preferably from about 20 to 60% by weight.

In preparing the polymers of the invention, the proportion of the components A) to F) is chosen such that the ratio of isocyanate group equivalents of component F) to equivalents of isocyanate-reactive groups of components A) to E) is within the range, used in accordance with the invention, of from 0.4:1 to 0.9:1.

In general, the polyurethane polymers of the invention containing polar functional groups in an amount of from about 1.3 to 3.5% by weight are self-dispersible, and so the use of a dispersing auxiliary can be dispensed with. If desired, however, it is possible to prepare them using customary dispersing auxiliaries known to the skilled worker. Examples of these include the emulsifiers and protective colloids mentioned below.

In accordance with one suitable embodiment, the polymer dispersions of the invention further comprise at least one dispersing auxiliary. In that case, polyurethane polymers suitable for preparing these polymer dispersions include those containing a relatively small proportion of incorporated compounds of compound B) and thus of dispersion-active groups. These polymer dispersions are preferably prepared using a polymer containing component B) incorporated in an amount of from about 0.1 to 15% by weight, preferably from about 0.1 to 10% by weight, based on the overall amount of components A) to F).

To prepare the polymer dispersions which further comprise at least one dispersant it is preferred to use polymers having a polar functional group content that is in a range from about 0.8 to 1.5% by weight, in particular from about 0.9 to 1.3% by weight.

Through the use of at least one dispersing auxiliary it is possible advantageously to prepare polymer dispersions of the invention having a higher solids content and/or a lower viscosity than is the case with corresponding dispersions without dispersing auxiliaries.

The solids content of the polymer dispersions of the invention containing dispersing auxiliaries is preferably at least 38% by weight, preferably at least 40% by weight.

The polymer dispersions of the invention preferably and in general have lower viscosities than dispersions based on polyurethanes in whose preparation 100% of the isocyanate-reactive groups have been reacted.

The viscosity of the polymer dispersions of the invention containing dispersing auxiliary, determined in accordance with DIN 53019 using a Rheomat 30 (23° C., shear rate $D=250\ s^{-1}$), is preferably not more than 1000 mpas, more preferably not more than 700 mPas.

As dispersing auxiliaries it is possible in general to use customary emulsifiers and/or protective colloids. The amount used is generally in a range from about 0.05 to 20% by weight, preferably from about 0.1 to 15% by weight, based on the amount of the curable polyurethane polymer.

Suitable emulsifiers are the emulsifiers known to the skilled worker and commonly used as dispersants for aqueous emulsion polymerization, as are described, for example, in Houben-Weyl, Methoden der organischen Chemie, Volume XIV/1, Makromolekulare Stoffe [Macromolecular substances], Georg-Thieme-Verlag, Stuttgart, 1961, pp. 411–420. Anionic, cationic, and nonionic emulsifiers are suitable. It is preferred to use emulsifiers whose relative molecular weights, unlike those with protective colloids, are usually below 3500 daltons.

Nonionic emulsifiers which can be used are araliphatic or aliphatic nonionic emulsifiers, examples being ethoxylated mono-, di- and trialkylphenols (EO units: 3 to 50, alkyl: $C_4$–$C_{10}$), ethoxylates of long-chain alcohols (EO units: 3 to 50, alkyl: $C_8$–$C_{36}$), and polyethylene oxide/polypropylene oxide block copolymers. Preference is given to ethoxylates of long-chain alkanols (alkyl: $C_{10}$–$C_{22}$, average degree of ethoxylation: from 10 to 50) and, of these, particular preference to those having a linear $C_{12}$–$C_{18}$ alkyl radical and an average degree of ethoxylation of from 10 to 50, and also to ethoxylated monoalkylphenols.

Examples of suitable anionic emulsifiers are alkali metal salts and ammonium salts of alkyl sulfates (alkyl: $C_8$–$C_{22}$), of sulfuric monoesters with ethoxylated alkanols (EO units: 2 to 50, alkyl:

$C_{12}$–$C_{18}$) and with ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$–$C_{18}$). Further suitable emulsifiers are given in Houben-Weyl, op. cit., pp. 192–208.

Suitable anionic emulsifiers are likewise bis (phenoylsulfonic acid) ethers and the alkali metal salts or ammonium salts thereof which carry a $C_4$–$C_{24}$ alkyl group on one or both aromatic rings.

These compounds are general knowledge, from U.S. Pat. No. 4,269,749, for example, and are available commercially, for example, as Dowfax® 2A1 (Dow Chemical Company).

Suitable cationic emulsifiers are preferably quaternary ammonium halides, e.g., trimethylcetylammonium chloride, methyltrioctylammonium chloride, benzyltriethylammonium chloride, or quaternary compounds of N—$C_6$–$C_{20}$-alkylpyridines, -morpholines or -imidazoles, e.g., N-laurylpyridinium chloride.

Examples of suitable protective colloids are polyvinyl alcohols and partially hydrolyzed polyvinyl acetates, polyvinyl propionates, polyacrylates, polyvinylpyrrolidone, copolymers of two or more of the monomers forming the abovementioned polymers, cellulose and cellulose derivatives, such as methylcellulose, hydroxyethylcellulose, and carboxymethylcellulose, for example, starch and starch derivatives, such as cyanoalkyl ether starch, hydroxyalkyl ether starch and carboxymethyl starch, for example, proteins and protein degradation products, such as gelatin and gelatin derivatives, for example, etc. An in-depth description of the protective colloids is given in Houben-Weyl, op. cit., pp. 411–420.

For preparing the polymer dispersions of the invention containing dispersing auxiliaries it is preferred to use at least one protective colloid. Said colloid in particular comprises copolymers of vinylpyrrolidone and vinyl acetate or vinyl propionate, which for example are obtainable as Collacrale grades from BASF Aktiengesellschaft.

The curable aqueous polymer dispersions of the invention are suitable preferably for producing coatings on, for example, flexible and possibly absorbent substrates, such as paper, cardboard or leather, or nonflexible substrates of metal or plastic. They are preferably suitable for producing high-quality scratchproof and chemical-resistant finishes on wood. In this application, after the evaporation of the water and without crosslinking, tack-free, dust-dry films are obtained which have good mechanical load-bearing properties, such as high hardness and/or flexibility, for example. Thus the pendulum hardness, measured in accordance with DIN 53157, of a film dried at 60° C. for 20 minutes is at least 20 s, preferably at least 25 s. When the films which have not yet been radiation cured are examined for their freedom from tack, there is essentially no damage to the coating.

The polyurethanes can be crosslinked with high-energy radiation such as UV radiation, electron beams, X-rays or $\gamma$ radiation. Of these, UV curing is particularly preferred. It can be carried out, if desired, in the presence of customary photoinitiators, such as aromatic ketone compounds, for example, such as benzophenone, alkylbenzophenones, Michler's ketone, anthrone, halogenated benzophenones, 2,4,6-trimethylbenzoyldiphenylphosphine oxide, phenylglyoxylic esters, anthraquinone and its derivatives, benzil ketals, hydroxyalkylphenones, etc. It is also possible to use mixtures of these compounds. The amount of photoinitiators used is generally from about 0.01 to 20% by weight, preferably 0.1 to 10% by weight, based on the solids content of the components to be cured.

The curing of the aqueous polymer dispersions can also, if desired, take place thermally by a free-radical mechanism with addition of the customary polymerization initiators. These include all compounds which under the conditions of curing break down into free radicals, examples being peroxides, hydroperoxides, hydrogen peroxide, persulfates, azo compounds, and what are known as redox catalysts. Preference is given to the use of water-soluble initiators. In this context it is also possible to use mixtures of different polymerization initiators, for example, mixtures of hydrogen peroxide and sodium or potassium peroxodisulfate. Organic peroxides suitable as initiators are described, for example, in EP-A-536 597. The amount of polymerization initiators used is generally from about 0.01 to 5% by weight, based on the amount of polyurethanes to be polymerized. Further suitable initiators include redox catalysts, comprising at least one of the abovementioned per compounds, for example, as oxidizing component and as reducing component, for example, ascorbic acid, glucose, sorbose, ammonium or alkali metal hydrogen sulfite, thiosulfate, hyposulfite, pyrosulfite or sulfide, metal salts such as those with iron(II) ions or silver ions, or sodium hydroxymethylsulfoxylate.

The pendulum hardness of a radiation-cured film 1 hour after radiation curing is generally at least 160 s. The UV-cured films obtained with the polyurethane dispersions of the invention exhibit essentially no deterioration in the pendulum hardness following radiation curing. Thus the pendulum hardness 12 hours after radiation curing is also generally at least 160 s. The flexibility was determined by measuring the Erichsen indentation in accordance with DIN 53156. In this case, surprisingly, even when using an aromatic polyisocyanate such as tolylene diisocyanate as component F), the films obtained are of good flexibility. The Erichsen indentation of a radiation-cured film of the polymer dispersion based on a polymer of the invention, then, 24 hours after UV curing is generally at least 4.0, preferably at least 5.0.

The films obtained from the curable polymer dispersions of the invention are generally scratchproof. Thus the pencil hardness of the films following radiation curing is at least 3H, preferably at least 4H.

The polymer dispersions of the invention can be applied by customary techniques, such as spraying, rolling, knife coating, flow coating, brushing or dipping, to a wide variety of substrates. The polymer dispersions of the invention can be employed as the sole film-forming binder or combined with additives customary in coatings technology, such as binders, auxiliaries, pigments, dyes, or flatting agents, for example.

The invention additionally provides coating compositions comprising at least one polymer of the invention or an aqueous polymer dispersion. These coating compositions may if desired include a solvent mixture of water and at least one of the abovementioned water-miscible solvents. These coating compositions are, preferably, essentially free from organic solvents.

The invention is illustrated by the following nonlimiting examples.

EXAMPLES

The hydroxyl number is defined as mg KOH/g product. A suitable method of determining the hydroxyl number is described, for example, by J. Makes and J. Horky in farbe und lack, Vol. 94 (1988), 898 ff. It can likewise be determined titrimetrically in accordance with the following procedure:

1. Apparatus and Auxiliaries
   Laboratory balance accurate to 0.01 g
   Glass beakers 125 ml
   Titroprocessor 636 (from Metrohm)
   Dosimat E 635, Dosimat 665 (from Metrohm)
   0.25 N methanolic KOH, acetic anhydride 5% strength in THF-dioxane (ratio 1:1), 4-dimethylaminopyridine (DMAP) 1% strength in THF-dioxane
2. Procedure
2.1 Blank Value
   10 ml of DMAP solution are introduced using the Dosimat into a clean glass beaker and then 5 ml of acetic anhydride solution are added. These components are left to react for 5 minutes, with the beaker covered, and then 1 ml of deionized water is added. After a further 10 minutes, 100 ml of a 1:1 mixture of THF-dioxane are added and the mixture is subsequently titrated with 0.25 N methanolic KOH.
2.2 Sample
   About 1 g of sample in 10 ml of 4-dimethylaminopyridine solution are introduced using the Dosimat 665 to a glass beaker. Then 5 ml of acetic anhydride solution are added and the solutions are left to react for 5 minutes, with the beaker covered. Following the addition of 100 ml of 1:1 THF-dioxane, the mixture is titrated with 0.25 N methanolic KOH.
3. Evaluation OH number[mg KOH/g substance]=(Blank value ml−consumption sample ml)*56.1 g/mol*0.25 N*titer KOH/initial mass in g (solid)

The amount of polar functional groups present, i.e., of the carboxyl, phosphonate, and sulfonate groups, was determined from the initial mass of component B).

A) Polyurethane Preparation

A 4-necked flask fitted with stirrer, dropping funnel, thermometer and reflux condenser was charged with hydroxyl-containing unsaturated prepolymer in accordance with Table 1 and with the amounts stated in Table 2 of dimethylpropionic acid, chain extender where applicable, acetone and dibutyltindilaurate, and this initial charge was heated to reflux. Then a diisocyanate was added dropwise over the course of one hour in a proportion in accordance with Table 2. The reaction mixture was stirred at reflux temperature until its isocyanate group content remained virtually constant. It was then cooled to 40° C. and neutralized with the amount of triethylamine indicated in Table 2. After cooling to ambient temperature, the polyurethane solution was introduced with vigorous stirring into a mixture of ethylene diamine and water as per Table 2, whereupon a dispersion formed spontaneously. The acetone was then distilled off under reduced pressure at 40° C. and the dispersion, finally, was adjusted to the desired solids content by dilution with water. The properties of the dispersions are shown in Table 3.

TABLE 1

| Hydroxyl-containing prepolymers | |
|---|---|
| Prepolymer | Type |
| A | 46% by weight polyether acrylate<br>54% by weight bisphenol A diglycidyl ether diacrylate |
| B | 56% by weight polyether acrylate<br>44% by weight triglycidyl isocyanurate triacrylate |
| C | 50% by weight polyether acrylate<br>50% by weight (bisepoxycyclohexylmethyl carboxylate) diacrylate |
| D | 50% by weight polyether acrylate<br>50% by weight cyclohexanedimethylol diglycidyl ether diacrylate |

The prepolymers have OH numbers of more than 120 mg KOH/g.

TABLE 2

Polyurethane preparation

| Ex. No. | Prepolymer from Tab. 1 [g] | Dimethylolpropionic acid [g] | Dibutyltin dilaurate [g] | Acetone [g] | Isocyanate [g] | Triethylamine [g] | Ethylene di amine [g] | Chain extenders [g] | Water [g] | Dispersant[5] [% by wt.] | Degree of reaction of the NCO-reactive groups [%] |
|---|---|---|---|---|---|---|---|---|---|---|---|
| C1 | 150 A | 20.1 | 0.26 | 139 | 62.16 IPDI[1] 23.18 HDI[2] | 15.16 | 3.6 | 4.5 PE-diol[3]<br>2.25 BD-1,4[4] | 420 | none | 100 |
| 1 | 150 A | 20.1 | 0.26 | 139 | 54.83 IPDI 20.66 HDI | 15.16 | 3.6 | 4.5 PE-diol<br>2.25 BD-1,4 | 407 | none | 75 |
| 2 | 150 A | 20.1 | 0.26 | 139 | 48.39 IPDI 18.23 HDI | 15.16 | 3.6 | 4.5 PE-diol<br>2.25 BD-1,4 | 394 | none | 50 |
| C2 | 155 A | 20.1 | 0.27 | 138 | 56.83 IPDI 21.50 HDI | 12.12 | 3.6 | none | 404 | none | 100 |
| 3 | 150 A | 20.1 | 0.27 | 138 | 43.95 IPDI 16.63 HDI | 15.16 | 3.6 | none | 375 | none | 50 |
| C3 | 150 B | 20.1 | 0.26 | 139 | 66.16 IPDI 23.18 HDI | 15.16 | 3.6 | 4.5 PE-diol<br>2.25 BD-1,4 | 420 | none | 100 |
| 4 | 150 B | 20.1 | 0.26 | 139 | 48.39 IPDI 18.29 HDI | 15.16 | 3.6 | 4.5 PE-diol<br>2.25 BD-1,4 | 394 | none | 50 |
| C4 | 150 C | 20.1 | 0.26 | 139 | 66.16 IPDI 23.18 HDI | 15.16 | 3.6 | 4.5 PE-diol<br>2.25 BD-1,4 | 420 | none | 100 |
| 5 | 150 C | 20.1 | 0.26 | 139 | 48.39 IPDI 18.23 HDI | 15.16 | 3.6 | 4.5 PE-diol<br>2.25 BD-1,4 | 394 | none | 50 |
| 6 | 150 D | 20.1 | 0.26 | 139 | 48.39 IPDI 18.23 HDI | 15.16 | 3.6 | 4.5 PE-diol<br>2.25 BD-1,4 | 394 | none | 50 |
| C5 | 150 A | 8.04 | 0.23 | 133 | 52.39 IPDI 19.74 HDI | 6.06 | 5.4 | 4.5 PE-diol<br>2.25 BD-1,4 | 232 | 42 (30-% strength) | 100 |
| 7 | 150 A | 8.04 | 0.27 | 133 | 47.17 IPDI 17.81 HDI | 6.06 | 5.4 | 4.5 PE-diol<br>2.25 BD-1,4 | 225 | 42 (30-% strength) | 80 |
| C6 | 150 A | 20.1 | 0.26 | 139 | 71.95 TDI[6] | 15.16 | 3.6 | 4.5 PE-diol<br>2.25 BD-1,4 | 401 | none | 100 |
| 8 | 150 A | 20.1 | 0.26 | 139 | 65.85 TDI | 15.16 | 3.6 | 4.5 PE-diol<br>2.25 BD-1,4 | 393 | none | 80 |
| 9 | 150 A | 20.1 | 0.26 | 139 | 65.85 TDI | 14.40[7] | 3.6 | 4.5 PE-diol<br>2.25 BD-1,4 | 393 | none | 80 |

[1] Isophorone diisocyanate
[2] Hexamethylene diisocyanate
[3] Polyesterol made from isophthalic acid, adipic acid (1:1) and hexanediol, $M_n$ = 1000
[4] 1,4-Butanediol
[5] Copolymer of vinylpropionate and vinylpyrrolidone; amount by weight based on overall weight of all components including solvent/dispersant
[6] Isomer mixture of 80% 2,4- and 20% 2,6-tolylene diisocyanate
[7] 95% neutralized B) Properties of the Polymer Dispersions The solids content of the aqueous polymer dispersions were determined in accordance with DIN 53216 Part 1 (1 h, 125° C.).

The viscosity was determined in a Rheomat 30 in accordance with DIN 53019 at a temperature of 23° C. and a shear rate D 250 s$^{-1}$.

The properties of the dispersions are reproduced in Table 3.

TABLE 3

Properties of the dispersions

| Ex. No. | Solids content [%] | Viscosity [mPas] |
|---|---|---|
| C1 | 36 | 1667 |
| 1[a] | 40 | 3359 |
| 2[a] | 38 | 2986 |
| C2 | 38 | 2289 |
| 3 | 40 | 55.5 |
| C3 | impossible to obtain stable dispersion | not measurable |
| 4 | 40 | 2065 |
| C4 | impossible to obtain stable dispersion | not measurable |
| 5 | 30 | 466.5 |
| 6 | 40 | 1079.8 |
| C5 | 47 | not measurable |
| 7 | 50 | 544.2 |
| C6 | 40 | 845.9 |
| 8 | 40 | 119.5 |
| 9 | 40 | 91.7 |

[a] On dilution to a solids content of 36% these dispersions exhibit a viscosity of < 1667 mPas.

The polyurethane polymers of the invention can be formulated to polymer dispersions having good performance properties. In particular, these dispersions generally have high solids contents and lower viscosities than corresponding dispersions based on polymers in whose preparation 100% of the isocyanate-reactive groups have been reacted.

Dried and UV-cured films based on the polyurethane polymers of the invention likewise exhibit good performance properties: for example, high pendulum hardnesses, high pencil hardnesses and low Erichsen indentation values.

We claim:

1. A curable polyurethane polymer containing in copolymerized form
   A) from 10 to 60% by weight, based on the overall weight of components A) to F), of at least one hydroxyl-containing prepolymer having at least one thermally or photochemically polymerizable α,β-ethylenically unsaturated double bond,
   B) from 0.1 to 30% by weight, based on the overall weight of components A) to F), of at least one compound having at least one isocyanate-reactive hydroxyl group and/or primary or secondary amino group and, in addition, at least one polar functional group per molecule,
   C) from 0.1 to 30% by weight, based on the overall weight of components A) to F), of at least one compound selected from the group consisting of diamines, polyamines and mixtures thereof,
   D) from 0 to 10% by weight, based on the overall weight of components A) to F), of at least one further compound other than A), B), C) and E) having at least two isocyanate-reactive groups, which are hydroxyl groups and mixtures of hydroxyl groups with primary and/or secondary amino groups,
   E) from 0 to 20% by weight, based on the overall weight of components A) to F), of at least one compound having an isocyanate-reactive group,
   F) from 10 to 65% by weight, based on the overall weight of components A) to F), of at least one compound having at least two isocyanate groups, or a salt thereof, wherein the ratio of isocyanate group equivalents of component F) to equivalents of isocyanate-reactive groups of components A) to E) is in a range from 0.45:1 to 0.8:1.

2. A polymer as claimed in claim 1, wherein the sum of the hydroxyl numbers of components A) and D) is in a range from 40 to 300 mg KOH/g.

3. A polymer as claimed in claim 1, wherein the prepolymer A) is selected from the polyester acrylates, polyether acrylates, polyurethane acrylates, epoxy acrylates and mixtures thereof.

4. A polymer dispersion comprising in dispersed form at least one curable polymer as claimed in claim 1.

5. A polymer dispersion as claimed in claim 4, further comprising at least one dispersing auxiliary.

6. A polymer dispersion as claimed in claim 5, whose solids content is at least 40% by weight.

7. A polymer dispersion as claimed in claim 5, whose solids content is at least 45% by weight.

8. A polymer dispersion as claimed in claim 4 in the form of an aqueous dispersion.

9. A coating composition comprising at least one polymer as claimed in claim 1.

10. A water-based coating composition comprising at least one polymer dispersion as claimed in claim 4.

* * * * *